United States Patent Office 3,372,528
Patented Mar. 12, 1968

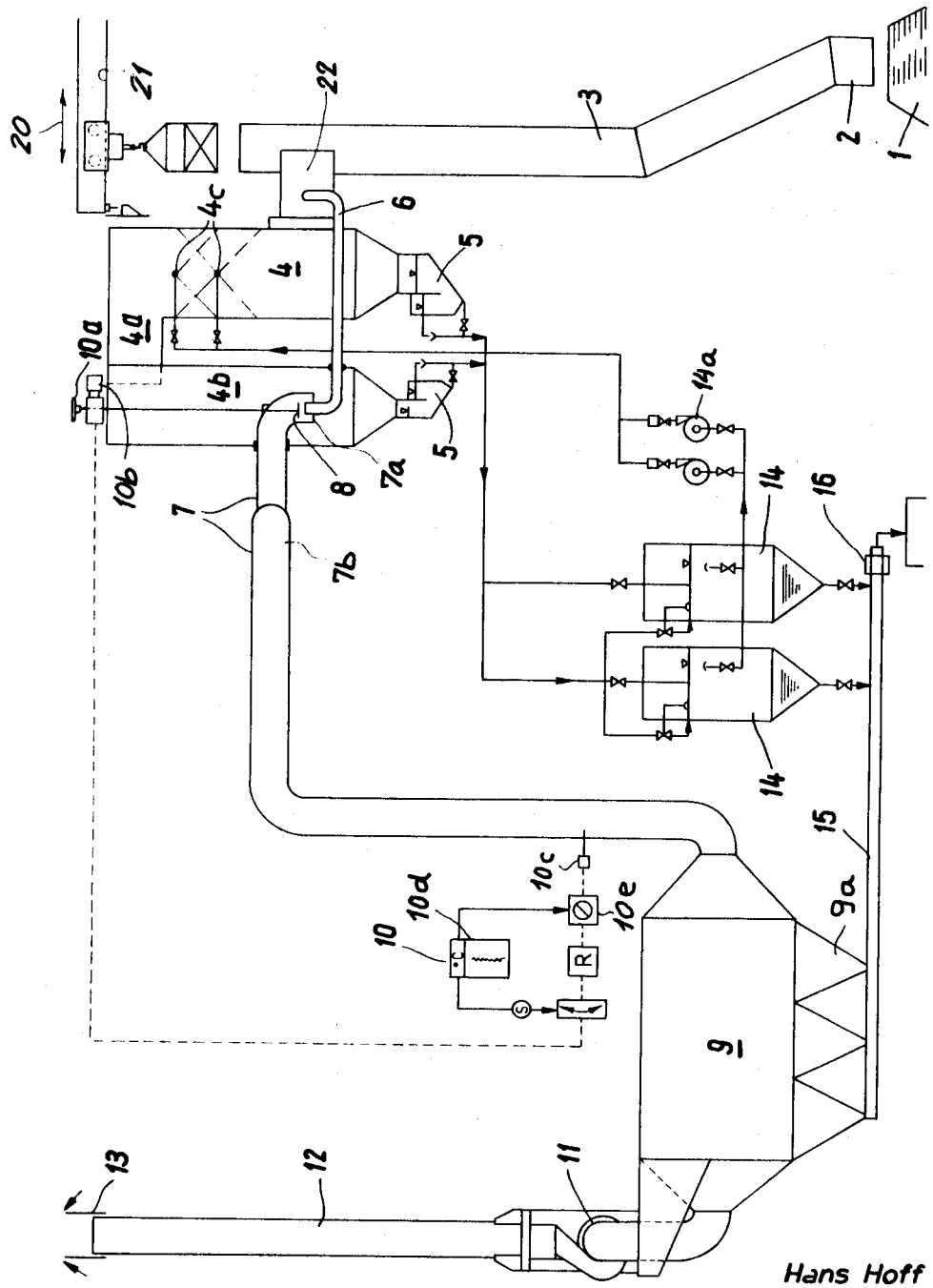

---

3,372,528
METHOD OF AND APPARATUS FOR THE REMOVAL OF DUST FROM CONVERTER AND OTHER EXHAUST GASES
Hans Hoff, Essen, Germany, assignor to Firma Gottfried Bischoff KG. Bau Kompletter Gasreinigungs- und Wasserruckkuhlanlagen, Essen, Germany, a corporation of Germany
Filed July 13, 1966, Ser. No. 564,983
Claims priority, application Germany, July 15, 1965, H 56,593
2 Claims. (Cl. 55—106)

ABSTRACT OF THE DISCLOSURE

A dust-removal system for eliminating dust from the hot gases emerging from the steel-making converter wherein a stack delivers partially cool exhaust gas to a gas-washing column which may be bypassed by a conduit opening upwardly in this column into the downwardly turned end of a pipe carrying the washed gases to an electrostatic filter. A temperature-responsive control system detects the gas temperature at the entrance to the electrostatic filter and operates a valve member cooperating with the upwardly turned end of the bypass conduit to regulate the amount of hot exhaust gas mixed with the washed gas to maintain the gas temperature at the entrance to the electrostatic filter substantially constant.

---

My present invention relates to the purification of industrial waste gases and especially metallurgical waste gases (e.g., from steel-making converters and other furnaces) by the removal of particulate material therefrom.

The removal of dust and other particles (usually ranging in size from $10^{-3}$ to $10^2$ microns) from converter waste gases and the exhaust gases of other metallurgical processes has been a problem long confronting industry. The problem is made all the more difficult because such exhaust gases, especially when derived from a metallurgical process, generally contain large portions of combustibles as well as relatively high-boiling components which are condensed even upon slight cooling of the gas mixture. Thus, it is a common practice to burn the combustible fraction of the waste gas by effecting a high-temperature or catalytic reaction with oxygen (derived from mixing air with the waste gas) in order to insure complete or substantially complete precipitation and removal of impurities from the gas stream.

For the purification of converter exhaust gases, four basic systems are employed. In one system, a cooling chamber is provided with a dry electrostatic dust precipitator or filter using electrostatic principles for the collection of the particulate components. In a second system, a cooling chamber is provided with a differential-pressure liquid-operated gas washer, while a third system involves the use of a cooling chamber with wet electrostatic precipitation; in a precipitator of this type, the electrodes are coated with a dynamic or flowing film of water which serves to carry away precipitated particles. In the fourth commonly employed system, the cooling chamber is provided upstream of a regenerative by cooled tower or column containing cold-storage material and usually of the Cowper type; this cooling tower is followed by a filtering unit using fabric filters. In all of the systems described above, it is desirable to operate with a converter gas which is as completely burned as possible although differential-pressure washers are also operable with converter gases whose combustion has been partially limited or suppressed.

As indicated earlier, all of these prior-art systems have various degrees of efficiency and are not always completely satisfactory in a technological sense. Thus, when one operates with a system using a dry precipitation method, it is essential to insure total oxidation of all combustible components by admixing with the converter gas a large quantity of air or other oxygen-containing medium. The air factor or ratio of air supplied to total throughput of the electrostatic filter is relatively high. Not only does the cooling chamber have to be larger to accommodate the increased volume of the throughput as thus constituted, but considerable expense arises from the cost of the increased apparatus necessary for dissipating the large quantities of heat generated by the combustion of the exhaust gas. In practice it is found that this system requires such a large purification installation that it cannot be accommodated within the converter rooms of the steel plant and must be disposed externally and connected to the converter installations via complex hot-gas pipes.

Another disadvantage is that the control of humidifying or moisturizing the converter exhaust gas to improve dust removal and purification becomes increasingly difficult because of the long path between the converter and the dust-separating means. It has been found that temperature fluctuations in the converter gas during even the blow period of a converter is so great in such systems as to bar the effective injection of moisture into the gas stream by means of nozzles or the like. Furthermore, an extensive purification is necessary to prevent the undesirable and deleterious components of the gas mixture from clogging the filter electrodes and even entering the electric precipitator. In fact, a lime component of the dust is accumulated at the same time that the dewpoint of the gas mixture is passed by inherent temperature reduction in the filter. The result is a binding action whereby the lime component agglomerates with the other components of the gas stream and creates difficulties in clearing the filter. Moreover, it must be pointed out that prior dry electrical precipitation methods involved the dangers of explosion inasmuch as a carbon monoxide component and oxygen pass through the electrical filter together. A backfire through the filter at the low-velocity portions of the gas mixture is thus possible even though, at other parts of the system, the gases may move at speeds close to or in excess of the flame-propagation speed.

When one employs a differential-pressure washer, the fluid-displacement systems must be dimensioned with capacity considerably greater than any other systems because of the relatively high gas pressure required to force the gas through the water streams. Furthermore, an elevated pressure is required in the wash-liquid line to maintain washing efficiency. A further disadvantage in connection with this system resides in the requirement for extensive and complex means, occuping considerable space, for extracting the collected dust or contaminants from the washing liquid.

Both liquid-film electrical precipitators and fabric filters have the disadvantage long recognized in the art that considerable energy is required to force the gas through the interstices of the filter and the high surface tension films thereof. Mechanical filter stacks must, as has been indicated earlier, be provided in tandem with Cowper-type cooling towers, etc. and thus involve considerably greater capital expenditure without significant improvement in the efficiency of the dust removal. Liquid-film systems, moreover, require the water-purification and recovery systems described above. Another factor is the requirement that such systems be operated with a high ratio of air to converter gas because of the pyrophoric nature of the dust and its tendency to explode on the filter and under the influence of the electrostatic charges developed thereon. A similar disadvantage characterizes substantially all systems for the extraction of dust particles and other air pollutants from the exhaust gases of metallurgical and industrial furnaces.

It is, therefore, the principal object of the present invention to provide an improved method of and apparatus for the removal of dust particles from exhaust gases and preferably converter gases having a high combustible content, which are free from the disadvantages enumerated above and permits an efficient purification of the gas with limited capital expenditure and without dangers of the type hitherto encountered.

A further object of this invention is to provide the system in combustion with a steel-make converter, for efficiently and economically purifying waste gases thereof.

Yet another and more specific object of the instant invention is to provide a system for the removal of dust particles from hot exhaust gas, generally that of a steel-making converter, wherein the energy requirements per unit volume of gas treated is minimized and low utilization of washing liquid is insured.

Another object of my invention is to provide a method of an apparatus for the removal of dust from the waste gases of industrial furnaces whereby the spacial requirements for the equipment can be held to a minimum.

These objects and others which will become apparent hereinafter are attained in accordance with the present invention by providing a system for treating the waste gases of a metallurgical converter or furnace with a gas-collecting hood, a cooling duct or stack, wet dust-removing unit together with blower means for passing gases in succession through these units. The invention resides principally in the discovery that most of the disadvantages hitherto encountered in gas-purification systems can be obviated when the gas-collecting hood, the gas-cooling stack or duct, the wet-treatment unit and a dry electrostatic precipitator or filter are connected in succession and the parameters of the gas stream treated are selected such that the dry electric precipitator or filter operates without incrustation and scaling or substantial reduction in its operating efficiency because of such incrustation. This is insured by proper adjustment of the capacity of the cooling duct, the wet dust-removal unit and the blower means. In a preferred embodiment of my invention, I provide beyond the gas-collecting hood and shunting at least the liquid-operating separating unit a bypass duct for leading a partial stream of the hot dry converter gas or other waste gases into the cool and moist gas stream passing from the liquid-operated dust-removal device into the dry-operated electrostatic filter. This insures a simple control of the gas temperature and the dewpoint over the entire converter run or throughout any other critical period so that the dry electric precipitator can operate at its greatest efficiency. The arrangement is so designed according to a preferred feature of this invention, that the bypass duct leads away from the cooling duct at the region at which it is connected with the liquid-operated dust-removal device. In general, the bypass duct is provided with control means in the form of valves or other flow-regulating devices which can be connected in suitable circuitry for automatic regulation of the bypass quantity in accordance with the temperatures and quantities of the gases treated.

I have found it to be important that the bypass conduit open into the pipe connecting the water/gas washer with the dry electric filter just behind or beyond the washer. Moreover, the gas-displacement means (e.g. a blower) is preferably provided forwardly of the electric filtering system so that a slight excess pressure is developed in the latter unit. This characteristic is important for systems which must deal with explosive gases such as are obtained as the waste gases of furnace systems and steel-making converters. It is thus possible to operate with converter exhaust gases manifesting incomplete combustion of its burnable components. Such gases could be treated heretofore only in water washing systems so that the low residual dust contents characteristic of electric filters could not be achieved. In the system of the present invention, however, it is possible to obtain filtration efficiencies such that the gases fed to the electric filter can contain about 150–200 grams per cubic meter (standard temperature and pressure) with an air factor $$n=\frac{A}{A_o}=0.1 \text{ to } 0.3$$

Even under these conditions the system of the present invention insures almost total removal of the dust particles without clogging the electric filter or material dust of explosion. Furthermore, the capacity of the system in terms of flow cross-section is increased without increasing the overall size of the arrangement. Best results are obtained when the washing device is a differential pressure washer as will become apparent hereinafter.

The above and other obejcts, features and advantages of the present invention will become more readily apparent from the following description, reference being made to the accompanying drawing in which the sole figure is a flow diagram, in elevation, of a plant or system in accordance with the present invention.

The system illustrated in the drawing is described with reference to a specific example of the operation of the method of this invention. Thus the drawing shows a steel-making converter 1 whose mouth is turned toward the gas-collecting means here constituted as a hood 2. The system can be shiftable in the direction of arrow 20 upon a rail 21 so that the hood 2 can be used in conjunction with the individual converters 1 of an entire row. The hood 2 communicates with a vertical stack 3 which, in turn, feeds the washing vessel 4 via a short connecting piece 22. When the converter blow begins, the converter hood 2 and the chimney-like stack 3 are already filled with air so that a false indication of the converter output is provided by the gases initially passing through the system. At the mouth of the converter, the air quantity is less than that necessary for complete combustion of all of the components of the evolved gas and the air factor $n$ at the mouth is, for economical reasons, held below $n=0.3$ to 0.5. The exhaust gases thus pass into the stack 3 where they are mixed thoroughly with air drawn from the ambient atmosphere by the hood in the gap between the mouth of the converter and the hood. The stack 3 has a circular or polyhedral cross section with a small hydraulic diameter and a long combustion length so that a thorough reaction of the gases is effected within the stack. In this manner, the carbon monoxide and oxygen ratio is shifted outside the explosive limit and the resulting gases are delivered to the washer 4. The dimensions of the stack 3 are so selected that the temperature at the end of the system is substantially constant during the entire blow time without requiring the addition of further oxygen to the gases at the mouth of the converter.

The exhaust gases pass directly from the cooling stack 3 into the washing chamber 4 in which they are subjected to differential-pressure spray treatment in the usual manner without material pressure loss so that 50–90% of the total dust content is washed from the gas.

The calcium oxide or lime component is here also washed from the gas in a flood of liquid so that no difficulties are encountered with respect to encrustation. Moreover, the gases subjected to the washing treatment are cooled and humidified. A series of water-separating chambers 4a and 4b form a labyrinth path for the gas and the contaminated liquid is collected at troughs 5 individual to these chambers or a single such trough from which the contaminated liquid is conducted away. From the water-separator 4b, the gas flows in a completely saturated state into the pipe 7 which has a downward return portion 7a open in the separating compartment 4b of the gas washer in such manner that the pipe 7 cannot be blocked. To facilitate movement of the system 2, 3, 4, etc. along the road of converters pipe 7 is telescopically constructed at 7b. A subatmospheric or reduced pressure of approximately 50 to 100 mm. (Hg) when a nozzle spray device serves as the washing unit or 150 to 350 mm. for a differential pressure washer is sustained at the pipe 7. The temperature of the gas delivered to the dry electric filter 9 is maintained at approximately 150° C. and controlled by a slide-valve plate 8 overlying the upturned portion of the bypass conduit 6. A handwheel 10a which can be driven by a servomotor 10b from a control unit 10 regulates the proportion of bypassed hot gas. A thermally responsive element 10c operates the ordinary thermostatic control device 10 which is shown in diagrammatic form and can include a gauge 10d, an adjusting means 10e, etc. The sensing device 10c is located proximally to the inlet of the filter 9 and serves to maintain optimum temperature and humidity conditions at this filter. The control device 10 also ensures that the proportion of hot gas from the bypass at the beginning of the blow prevents the dewpoint of the gas from being passed. The gases from the filter 9 are drawn by the blower 11 at its outlet from the system and expelled through a stack 12 to the atmosphere or to a utilization plant. A burner 13 flames off excess carbon monoxide. The dust extracted at 9a from the filter 9 has a dampness or moisture content of about 1% and is carried by a conveyor worm 15 to a mixing station 16 having a scraper belt. There the sludge settled from tanks 14 of the water purification station is mixed with the dust. The sludge has a moisture content of 50–60%. The settling tanks 14 operate alternately with the purified liquid being pumped at 14a to the spray heads 4c of the washing columns. The water remains in the settling tanks 14 for approximately an hour to settle the sludge before it is drawn off to the mixing device 16.

The invention described and illustrated admits of many modifications readily apparent to those skilled in the art and included in the scope of the appended claims.

I claim:

1. A dust-removal apparatus for separating particulate matter from hot exhaust gas evolved by a steel-making converter, said apparatus comprising, in combination:
    (a) a gas-collecting hood overlying said converter and receiving hot exhaust gas carrying particulate matter from said converter;
    (b) a gas-cooling chimney stack communicating with and extending upwardly from said hood for cooling the hot exhaust gas received by said hood from said converter as said hot exhaust gas passes upwardly through said stack;
    (c) gas-washing means including a differential-pressure water/gas direct-contact column connected with said stack for treating the exhaust gas emerging therefrom with water to cool further the treated gas and incorporate therein water vapor;
    (d) electrostatic-filter means receiving the gas emerging from said column for further purification thereof, said electrostatic-filter means having an inlet communicating with said column and an outlet for discharging purified gas to the atmosphere;
    (e) a pipe connecting said inlet of said electrostatic-filter means with said column while having a downwardly turned end in said gas-washing means;
    (f) a bypass conduit communicating with said stack and extending into said gas-washing means while having an upwardly turned end received in the downwardly turned end of said pipe and opening into the latter;
    (g) control means including a valve member displaceable in said downwardly turned end of said pipe and cooperating with the upwardly turned end of said conduit for selectively blocking and unblocking communication between said bypass conduit and said pipe, said valve member having a stem extending upwardly from said downwardly turned end of said pipe and being displaceable at a location remote therefrom, temperature-responsive means proximal to said electrostatic-filter means for sensing the temperature of the gas delivered by said pipe to said electrostatic-filter means, and operating means controlled by said temperature-responsive means and coupled with said stem for displacing said valve member relatively to said upwardly turned end of said bypass conduit and regulating the quantity of warm gas shunted from said stack to said pipe past said column to maintain the temperature of the gas mixture supplied to said electrostatic-filter means substantially constant;
    (h) blower means at said outlet for drawing gas from said electrostatic filter means and discharging it to the atmosphere; and
    (i) means for recovering from the water used in said column particulate contaminants of the hot exhaust gas emerging from said converter and for recirculating purified water to said column for direct-contact washing of the gas therein.

2. The apparatus defined in claim 1 wherein the stack has a relatively small flow cross-section and a relatively large length for sustaining combustion of the hot exhaust gases emerging from the converter in said stack, said gas-washing means comprising a plurality of chambers forming a labyrinth path for the gas in direct contact with the water, said ends being located in one of said chambers, said control means including a gauge for indicating the temperature sensed by said temperature-responsive means, and adjustment means responsive to said gauge for setting said operating means.

References Cited

UNITED STATES PATENTS

| | | | |
|---|---|---|---|
| 1,152,459 | 9/1915 | Weld | 216—39 |
| 1,444,627 | 2/1923 | Meston | 55—122 |
| 1,819,643 | 8/1931 | Fleisher | 55—224 X |
| 1,820,734 | 8/1931 | Feldmann | 55—106 |
| 1,842,663 | 1/1932 | Ellis | 55—224 |
| 1,986,529 | 1/1935 | Ray. | |
| 2,062,397 | 12/1936 | Chandler. | |
| 2,539,344 | 1/1951 | Carraway. | |
| 2,677,439 | 5/1954 | Hedberg. | |
| 2,696,892 | 12/1954 | Campbell | 55—122 X |
| 2,706,533 | 4/1955 | Hedberg et al. | 55—106 X |
| 2,862,701 | 12/1958 | McFeaters | 98—115 X |
| 2,911,061 | 11/1959 | Peterson | 55—134 X |
| 3,173,980 | 3/1965 | Hysinger. | |
| 3,221,475 | 12/1965 | Wiemer | 55—135 X |

FOREIGN PATENTS

| | | |
|---|---|---|
| 759,493 | 10/1956 | Great Britain. |
| 1,002,769 | 8/1965 | Great Britain. |
| 1,003,377 | 9/1965 | Great Britain. |

OTHER REFERENCES

Wacther et al.: German printed application (D), No. 1,085,854, printed July 1960 (1 sht. dwg., 1 page spec.) (Copy in Group 177, class 55, subclass 122).

FRANK W. LUTTER, *Primary Examiner.*

HARRY B. THORNTON, *Examiner.*

D. E. TALBERT, *Assistant Examiner.*